(12) United States Patent
Naito

(10) Patent No.: US 8,771,562 B2
(45) Date of Patent: Jul. 8, 2014

(54) OPTICAL WAVEGUIDE PRODUCTION METHOD

(75) Inventor: Ryusuke Naito, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 59 days.

(21) Appl. No.: 13/113,220

(22) Filed: May 23, 2011

(65) Prior Publication Data

US 2011/0298144 A1 Dec. 8, 2011

(30) Foreign Application Priority Data

Jun. 2, 2010 (JP) ................................. 2010-126714

(51) Int. Cl.
*B29D 11/00* (2006.01)

(52) U.S. Cl.
USPC ............................ 264/1.27; 264/1.36; 264/2.5

(58) Field of Classification Search
USPC ............... 264/1.1, 1.24, 1.27, 1.36, 1.38, 2.5, 264/219, 225; 425/808
See application file for complete search history.

(56) References Cited

U.S. PATENT DOCUMENTS

| | | | |
|---|---|---|---|
| 3,957,411 A | 5/1976 | Schiesser | |
| 2003/0117614 A1 | 6/2003 | Kikuchi et al. | |
| 2005/0212182 A1 | 9/2005 | Yokoyama et al. | |
| 2006/0091571 A1 | 5/2006 | Akutsu et al. | |
| 2007/0014523 A1* | 1/2007 | Ohtsu et al. | 385/89 |
| 2007/0064188 A1 | 3/2007 | Okamoto | |
| 2008/0013903 A1 | 1/2008 | Fujii et al. | |
| 2008/0193094 A1 | 8/2008 | Enami et al. | |
| 2008/0198144 A1 | 8/2008 | Shimizu et al. | |
| 2008/0277809 A1* | 11/2008 | Shimizu | 264/1.24 |
| 2009/0196559 A1 | 8/2009 | Makino et al. | |
| 2009/0261488 A1 | 10/2009 | Shimizu | |
| 2009/0286187 A1 | 11/2009 | Hodono et al. | |
| 2012/0251038 A1* | 10/2012 | Nagafuji et al. | 385/14 |

FOREIGN PATENT DOCUMENTS

| | | |
|---|---|---|
| CN | 101303436 A | 11/2008 |
| CN | 101561532 A | 10/2009 |
| JP | 51-42760 A | 4/1976 |
| JP | S60-141512 A | 7/1985 |
| JP | 61-138903 A | 6/1986 |

(Continued)

OTHER PUBLICATIONS

U.S. Office Action dated Apr. 3, 2013, issued in related U.S. Appl. No. 13/236,781.

(Continued)

*Primary Examiner* — Mathieu D. Vargot
(74) *Attorney, Agent, or Firm* — Westerman, Hattori, Daniels & Adrian, LLP

(57) ABSTRACT

An optical waveguide production method, employs a light-transmissive mold having higher dimensional accuracy for formation of an over-cladding layer. The mold for the formation of the over-cladding layer is unitarily produced by molding a light-transmissive resin with the use of a mold component having the same shape as the over-cladding layer. A recess formed in the mold by removing the mold component in the production of the mold serves as a cavity for the formation of the over-cladding layer. For the formation of the over-cladding layer, a photosensitive resin for the over-cladding layer is injected into the cavity of the mold, and exposed through the mold to be cured while a core formed in a predetermined pattern on a surface of an under-cladding layer is immersed in the photosensitive resin.

4 Claims, 3 Drawing Sheets

(56) References Cited

FOREIGN PATENT DOCUMENTS

| | | | |
|---|---|---|---|
| JP | 5-228946 | A | 9/1993 |
| JP | 2002-120286 | A | 4/2002 |
| JP | 2002-321227 | A | 11/2002 |
| JP | 2004-050493 | A | 2/2004 |
| JP | 2004-117585 | A | 4/2004 |
| JP | 2004-184480 | A | 7/2004 |
| JP | 2005-017816 | A | 1/2005 |
| JP | 2005-290106 | A | 10/2005 |
| JP | 2008-203431 | A | 9/2008 |
| JP | 2008-281654 | A | 11/2008 |
| JP | 2009-258417 | A | 11/2009 |
| JP | 2009-276724 | A | 11/2009 |
| WO | 2008/062836 | A1 | 5/2008 |

OTHER PUBLICATIONS

Notice of Allowance and Fee(s) Due dated Mar. 7, 2013, issued in related U.S. Appl. No. 13/173,391.
Notice of Allowance and Fee(s) Due dated Mar. 4, 2013, issued in related U.S. Appl. No. 13/173,887.
U.S. Office Action dated Sep. 14, 2012, issued in copending related U.S. Appl. No. 13/173,887.
U.S. Office Action dated Sep. 17, 2012, issued in copending related U.S. Appl. No. 13/173,391.
U.S. Office Action dated Sep. 25, 2012, issued in copending related U.S. Appl. No. 13/236,781.
Japanese Office Action dated Jun. 11, 2013, issued in corresponding Japanese Patent Application No. 2010-153343, w/ English translation.
Japanese Office Action dated Jun. 11, 2013, issued in related Japanese Patent Application No. 2010-153342, w/ English translation.
U.S. Non-Final Office Action dated Aug. 16, 2013, issued in related U.S. Appl. No. 13/173,391.
U.S. Non-Final Office Action dated Aug. 19, 2013, issued in related U.S. Appl. No. 13/173,887.
Japanese Office Action dated Jun. 25, 2013, issued in corresponding application No. 2010-126714, with English Translation.
U.S. Office Action dated Dec. 2, 2013, issued in related U.S. Appl. No. 13/173,391.
U.S. Office Action dated Dec. 5, 2013, issued in related U.S. Appl. No. 13/173,887.
Chinese Office Action dated Dec. 4, 2013, issued in related Chinese Patent Application No. 201110186064.1 with English translation (15 pages).
Chinese Office Action dated Dec. 6, 2013, issued in related Chinese Patent Application No. 201110186062.2 with English translation (14 pages).
Chinese Office Action dated Jan. 23, 2014, issued in corresponding Chinese application No. 201110144091.2, w/ English translation (15 pages).
Chinese Search Report dated Mar. 5, 2014, issued in corresponding Chinese application No. 201110303868.5, w/ English translation (5 pages).

* cited by examiner

F I G. 3
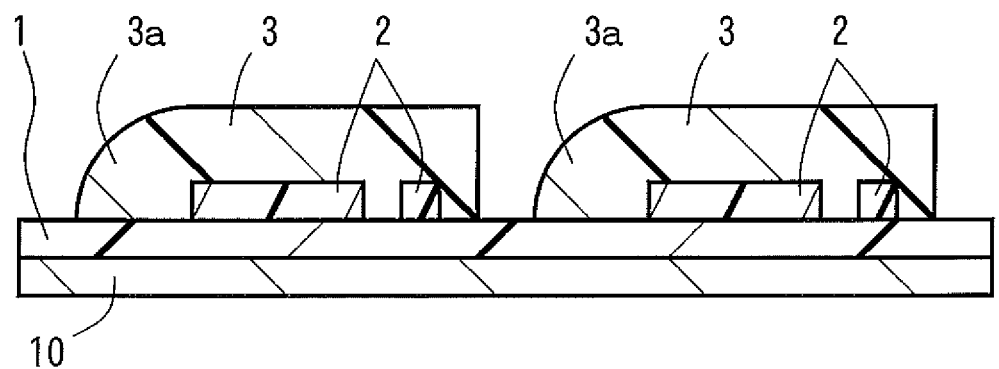

OPTICAL WAVEGUIDE PRODUCTION METHOD

BACKGROUND OF THE INVENTION

1. Field of the Invention

The present invention relates to a method of producing an optical waveguide to be widely used for optical communications, optical information processing, a position sensor and other general optics.

2. Description of the Related Art

An optical waveguide is typically produced by forming a core (light passage) in a predetermined pattern on a surface of an under-cladding layer, and forming an over-cladding layer to cover the core. Particularly, where the over-cladding layer is formed as having a desired shape (e.g., as having a lens portion at its end), the formation of the over-cladding layer is achieved with the use of a mold which includes a cavity having a mold surface conformable to the desired shape (see, for example, JP-A-2008-281654).

Where a photosensitive resin is used as a material for the over-cladding layer, the mold should transmit illumination radiation such as ultraviolet radiation and, therefore, a light-transmissive quartz mold is used as the mold. The cavity is provided in a lower surface of the quartz mold as having the mold surface conformable to the shape of the over-cladding layer. After the core is formed on the surface of the under-cladding layer, the lower surface of the mold is brought into intimate contact with the surface of the under-cladding layer with the core being properly positioned in the cavity of the mold. Subsequently, the photosensitive resin as the material for the over-cladding layer is injected into a molding space defined by the mold surface of the cavity, the surface of the under-cladding layer and a surface of the core, and then is exposed to the illumination radiation (e.g., the ultraviolet radiation) through the mold, whereby the photosensitive resin is cured. Then, the resulting product is demolded. Thus, the optical waveguide is produced, which includes the under-cladding layer, the core and the over-cladding layer.

When the quartz mold is produced as having the desired shape, a plurality of mold pieces for the mold are prepared, and then are bonded together with a bonding resin. This is based on the following ground. If cutting of a quartz block material is started or stopped at a middle portion of the block material, the block material is liable to crack. Therefore, the quartz block material should be cut from one side to the other side. For this reason, the quartz mold pieces are each produced by cutting the quartz block material from one side to the other side, and then are bonded together with the bonding resin, whereby the quartz mold is produced as having the desired shape.

However, the mold produced by bonding the mold pieces together has lower dimensional accuracy because of bonding offset. If the over-cladding layer is formed by using the mold having lower dimensional accuracy, it is impossible to position the core and the over-cladding layer in proper positional relation. As a result, light outputted from a distal end of the core, for example, cannot be properly converged by the lens portion provided at the end of the over-cladding layer, so that the light is outputted from the lens portion in a diverged state. Therefore, the intensity of the light received from the lens portion is reduced, resulting in poorer optical transmission characteristics.

SUMMARY OF THE INVENTION

In view of the foregoing, an optical waveguide production method employs a light-transmissive mold having higher dimensional accuracy for formation of an over-cladding layer of an optical waveguide.

The optical waveguide production method includes the steps of: forming a core in a predetermined pattern on a surface of an under-cladding layer; and forming an over-cladding layer to cover the core by using a mold including a cavity having a mold surface conformable to the shape of the over-cladding layer; wherein the mold is a light-transmissive resin mold produced by placing a mold component having the same shape as the over-cladding layer in a mold production container, filling the container with a light-transmissive resin, curing the light-transmissive resin, taking out the cured resin from the container and removing the mold component from the cured resin, and the cavity for the formation of the over-cladding layer is defined by a recess formed in the mold by the removal of the mold component; wherein the over-cladding layer forming step includes the steps of filling the cavity of the mold with a photosensitive resin as an over-cladding layer material, and exposing the photosensitive resin through the mold with the core being immersed in the photosensitive resin.

That is, the light-transmissive resin is used as a material for the mold for the formation of the over-cladding layer, making it possible to unitarily produce the mold by molding with the use of the mold component having the same shape as the over-cladding layer. The mold thus unitarily produced has higher dimensional accuracy.

In the optical waveguide production method, the mold for the formation of the over-cladding layer is unitarily produced from the light-transmissive resin with the use of the mold component having the same shape as the over-cladding layer. Therefore, the mold has higher dimensional accuracy. The recess formed in the mold by the removal of the mold component in the production of the mold serves as the cavity for the formation of the over-cladding layer. The over-cladding layer is formed by filling the cavity of the mold with the photosensitive resin as the over-cladding layer material, and exposing the photosensitive resin through the mold to cure the photosensitive resin while the core formed in the predetermined pattern on the surface of the under-cladding layer is immersed in the photosensitive resin. Since the formation of the over-cladding layer is thus achieved by using the mold having higher dimensional accuracy, the core can be accurately positioned with respect to the cavity of the mold in the over-cladding layer forming step.

Particularly, where a portion of the cavity of the mold corresponding to a portion of the over-cladding layer covering a distal end of the core has a lens-curvature mold surface, the over-cladding layer of the optical waveguide can be configured to have a lens portion which covers the distal end of the core. With this arrangement, light outputted from the distal end of the core can be outputted from the optical waveguide in a less divergent state due to the refracting effect of the lens portion of the over-cladding layer. Further, light inputted from a surface of the lens portion of the over-cladding layer can be inputted into the distal end of the core in a converged state due to the refracting effect of the lens portion. That is, the optical waveguide thus produced is excellent in optical transmission characteristics.

Where the light-transmissive resin for the mold contains a silicone resin, the mold has further higher dimensional accuracy. Thus, the resulting optical waveguide is more excellent in optical transmission characteristics.

BRIEF DESCRIPTION OF THE DRAWINGS

FIG. 3 is a sectional view schematically illustrating an optical waveguide produced by the production method.

DETAILED DESCRIPTION OF THE INVENTION

With reference to the attached drawings, an embodiment of the present invention will hereinafter be described in detail.

Figure 2A:
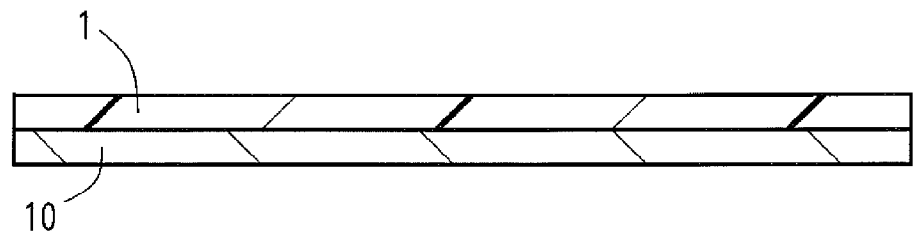
FIGS. 2A to 2D are schematic diagrams for explaining the optical waveguide production method using the mold described above.
Figure 2B:
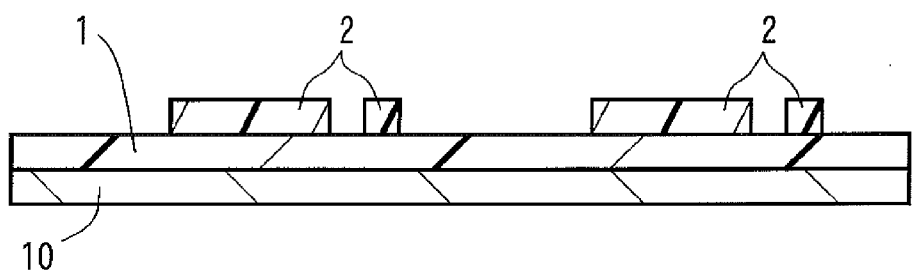
Figure 2C:
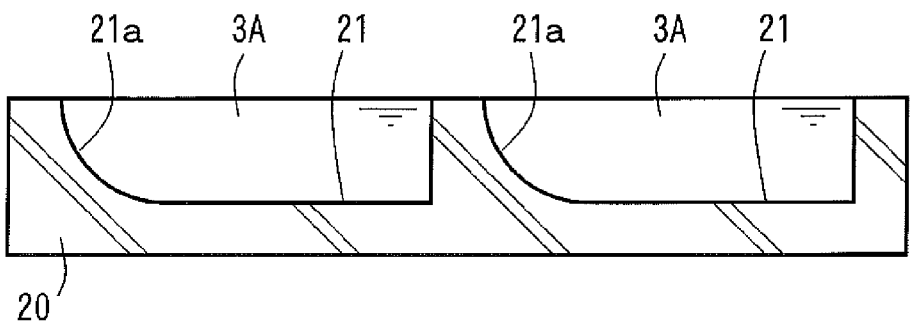
Figure 2D:
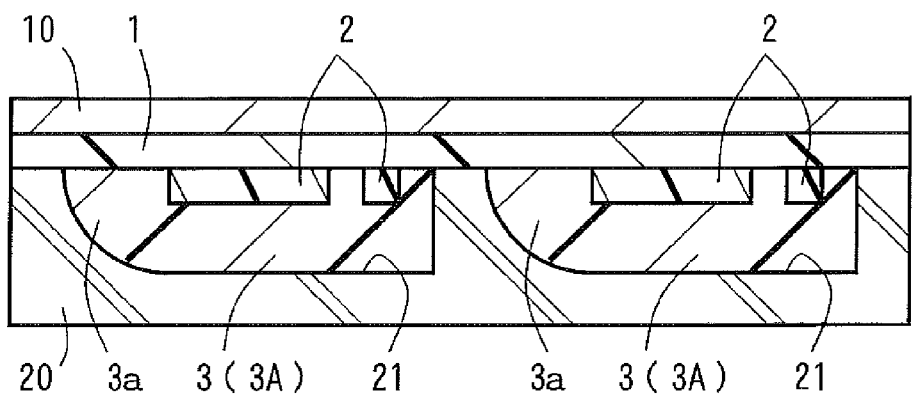

In an optical waveguide production method according to one embodiment, a mold 20 unitarily produced by molding a light-transmissive resin is used for formation of an over-cladding layer 3 (see FIG. 2D). Since the mold 20 is unitarily produced by molding the resin, the mold has higher dimensional accuracy, and is non-brittle and pressure-resistant unlike the prior-art quartz mold. A major feature is that the mold 20 is thus unitarily produced and the over-cladding layer 3 is produced with the use of the mold 20. In this embodiment, the mold 20 (see FIG. 2C) includes two cavities 21 provided in an upper surface thereof and each having a mold surface conformable to the shape of the over-cladding layer 3. The cavities 21 each have a lens-curvature mold surface 21a provided at one end thereof (a left end in FIG. 2C).

A method of producing the mold 20 will be described in detail.

Figure 1A:
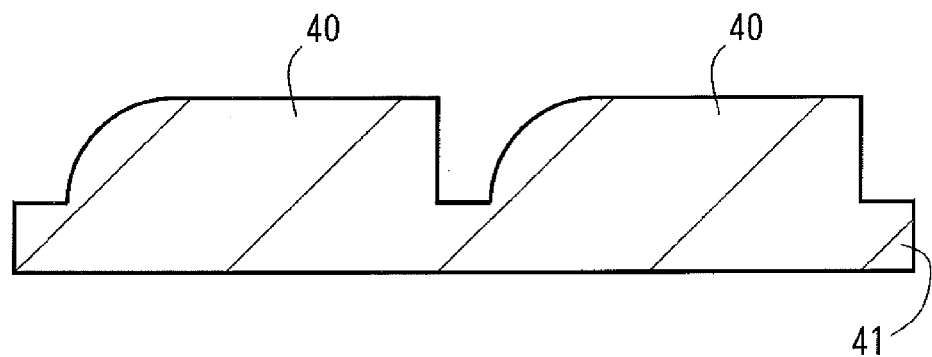
FIGS. 1A to 1C are schematic diagrams for explaining a method of producing a mold to be used for formation of an over-cladding layer in an optical waveguide production method according to one embodiment of the present invention.

First, as shown in FIG. 1A, a mold components 40 identical in shape with the over cladding layer 3 (See FIG. 3) is produced, with the mold components 40 protruding upwardly from an upper surface of the base member 41. The formation of the mold components 40 is achieved by cutting a plate by means of a cutting blade. Exemplary materials for the mold components 40 include aluminum, stainless steel and iron, among which aluminum is preferred for machinability.

Figure 1B:
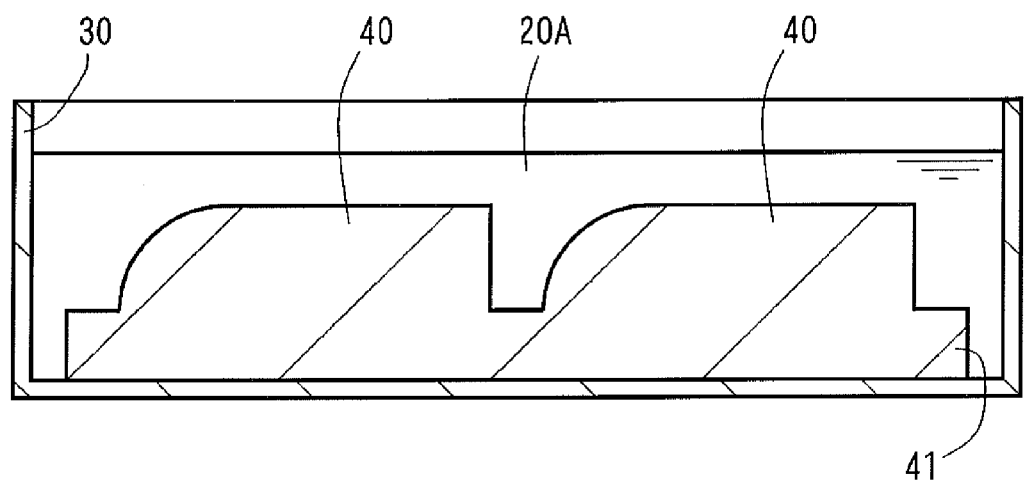

In turn, as shown in FIG. 1B, the structure including the mold components 40 and the base member 41 is placed in a mold production container 30. At this time, the structure is preferably placed on a bottom of the container 30 with the mold components 40 located on an upper side and with the base member 41 located on a lower side as shown in FIG. 1B. It is preferred to apply a release agent on an interior surface of the container 30 and surfaces of the mold components 40 and the base member 41.

Subsequently, as shown in FIG. 1B, the container 30 is filled with a liquid light-transmissive resin 20A so that the mold components 40 are entirely immersed in the light-transmissive resin 20A. Examples of the light-transmissive resin 20A include siloxane resins, acryl resins and epoxy resins, which may be used either alone or in combination. Particularly, the light-transmissive resin 20A preferably contains a silicone resin, because the resulting mold has higher dimensional accuracy.

Then, the light-transmissive resin 20A is cured. For the curing of the light transmissive resin 20A, an ordinary temperature atmosphere, a heated atmosphere or a combination of the ordinary temperature atmosphere and the heated atmosphere may be employed according to the type of the light-transmissive resin 20A.

Figure 1C:
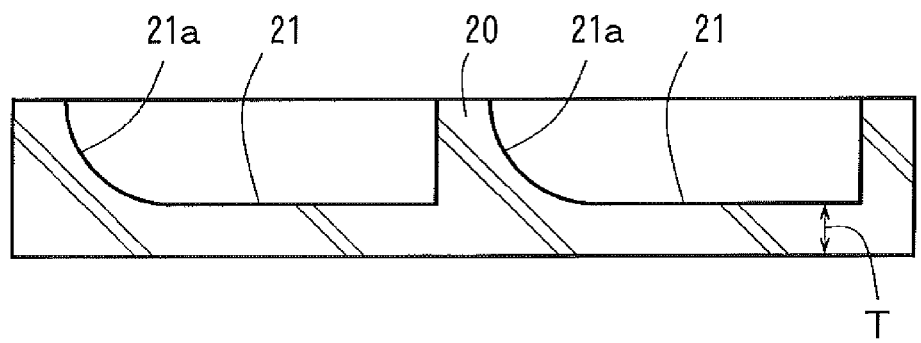

Thereafter, the cured light-transmissive resin is taken out together with the mold components 40 and the base member 41 from the container 30. Then, the structure including the mold components 40 and the base member 41 is removed from the cured light-transmissive resin. Recesses resulting from removal of the mold components 40 each serve as a cavity 21 (see FIG. 1C) having a mold surface conformable to the shape of the over-cladding layer 3 (see FIG. 2D). Further, an unnecessary portion of the cured light-transmissive resin which has been present laterally around the base member 41 is cut off. Thus, the mold 20 of the light-transmissive resin is produced as shown in FIG. 1C (as shown in a state vertically inverted from that shown in FIG. 1B). A portion of the mold 20 present between a bottom surface of the cavity 21 and a lower surface of the mold 20 preferably has a thickness T of 0.5 to 5.0 mm for transmittance and strength.

Next, an optical waveguide production method will be described in detail.

First, a planar base 10 (see FIG. 2A) to be used for formation of an under-cladding layer 1 is prepared. Exemplary materials for the base 10 include metals, resins, glass, quartz and silicon. Particularly, a stainless steel (SUS) substrate is preferred as the base 10. The stainless steel substrate is highly resistant to thermal expansion and contraction, so that its dimensions can be generally maintained at designed values in the production of an optical waveguide. The base 10 has a thickness of, for example, 20 µm (film) to 5 mm (plate).

In turn, as shown in FIG. 2A, the under-cladding layer 1 is formed on a surface of the base 10. A thermosetting resin or a photosensitive resin is used as a material for the under-cladding layer 1. Where the thermosetting resin is used, the formation of the under-cladding layer 1 is achieved by dissolving the thermosetting resin in a solvent to prepare a varnish, applying the varnish on the base 10 and heating the applied varnish. Where the photosensitive resin is used, on the other hand, the formation of the under-cladding layer 1 is achieved by dissolving the photosensitive resin in a solvent to prepare a varnish, applying the varnish on the base 10 and exposing the applied varnish to illumination radiation such as ultraviolet radiation. The under-cladding layer 1 has a thickness of, for example, 5 to 50 µm.

Subsequently, as shown in FIG. 2B, a core 2 is formed in a predetermined pattern on a surface of the under-cladding layer 1 by a photolithography process. A photosensitive resin which is excellent in patternability is preferably used as a material for the core 2. Examples of the photosensitive resin for the core 2 include UV-curable acryl resins, UV-curable epoxy resins, UV-curable siloxane resins, UV-curable norbornene resins and UV-curable polyimide resins, which may be used either alone or in combination. The core 2 has a trapezoidal or rectangular sectional shape, which permits easy patterning. The core 2 has a width of, for example, 10 to 500 µm, and a thickness of, for example, 30 to 100 µm.

The material for the core 2 should have a higher refractive index than the material for the under-cladding layer 1 and a material for an over-cladding layer 3 (see FIG. 3) to be described later, and should be transmissive to the wavelength of light to be transmitted through the core 2. As required, the refractive index is increased or reduced by changing at least one of the type and the proportion of an organic group to be introduced into the resin as the material for each of the under-cladding layer 1, the core 2 and the over-cladding layer 3. For example, the refractive index can be increased by introducing an aromatic ring group (a phenyl group or the like) into a molecule of the resin or by increasing the proportion of the aromatic group in the resin molecule. On the other hand, the refractive index can be reduced by introducing an aliphatic linear or cyclic group (a methyl group, a norbornene group or the like) into the resin molecule or by increasing the proportion of the aliphatic group in the resin molecule.

Then, as shown in FIG. 2C, the cavity 21 of the mold 20 produced for the formation of the over-cladding layer in the previous step is filled with a liquid photosensitive resin 3A as the material for the over-cladding layer 3 (see FIG. 2D). As shown in FIG. 2C, the cavity 21 of the mold 20 is positioned upwards during the filling.

Subsequently, as shown in FIG. 2D, the core 2 formed in the predetermined pattern on the surface of the under-cladding layer 1 is immersed in the photosensitive resin 3A as the over-cladding layer material. In this state, the core 2 is positioned with respect to the cavity 21 of the mold 20, and the under-cladding layer 1 is pressed against the mold 20. At this time, the press load is, for example, 49 to 980 N. Since the mold 20 has higher dimensional accuracy, the core 2 can be accurately positioned with respect to the cavity 21 of the mold 20. In addition, the mold 20 of the resin is resistant to pressure. Therefore, formation of burrs can be prevented by pressing the under-cladding layer 1 into intimate contact with the mold 20 as described above.

Then, the photosensitive resin 3A is irradiated with illumination radiation such as ultraviolet radiation through the mold 20 for exposure. Thus, the photosensitive resin 3A is cured, whereby the over-cladding layer 3 is formed as having a lens portion 3a at one end thereof. The over-cladding layer 3 has a thickness of, for example, 25 to 1500 μm (as measured from the surface of the under-cladding layer 1).

The over-cladding layer 3 is demolded together with the base 10, the under-cladding layer 1 and the core 2 from the mold 20. Thus, the optical waveguide is produced, which includes the under-cladding layer 1, the core 2 and the over-cladding layer 3 provided on the surface of the base 10 as shown in FIG. 3 (as shown in a state vertically inverted from that shown in FIG. 2D). In this embodiment, two optical waveguides are produced, and separated from each other for use.

As required, a heat treatment is performed before or after the demolding of the over-cladding layer 3. As required, the base 10 is separated from the under-cladding layer 1.

Where the optical waveguides are each produced as having a planar L-shape, finger touch position detecting means (position sensor) can be provided by employing these optical waveguides in combination. More specifically, two L-shaped planar optical waveguides are produced, which each include plural cores 2 extending from a corner of the L-shaped planar optical waveguide to inner edges of the optical waveguide in equidistantly spaced parallel relation. Then, a light emitting device is provided on an outer side of the corner of one of the optical waveguides, and optically connected to the cores of the one optical waveguide. Further, a light receiving device is provided on an outer side of the corner of the other optical waveguide, and optically connected to the cores of the other optical waveguide. In turn, these optical waveguides are placed along the periphery of a rectangular display screen of the touch panel. Thus, the optical waveguides serve as the finger touch position detecting means on the touch panel.

In this embodiment, the lens portion is provided at one end of the over-cladding layer, but the one end of the over-cladding layer may have a flat end face like the other end of the over-cladding layer.

Next, an inventive example will be described in conjunction with a comparative example. However, the present invention is not limited to the inventive example.

INVENTIVE EXAMPLE

Under-Cladding Layer Material

An under-cladding layer material was prepared by mixing 100 parts by weight of an epoxy resin (EP4080E available from Adeka Corporation) having an alicyclic skeleton, 2 parts by weight of a photoacid generator (CPI-200K available from San-Apro Ltd.) and 5 parts by weight of a UV absorber (TINUVIN479 available from Ciba Japan Inc).

Core Material

A core material was prepared by dissolving 40 parts by weight of an epoxy resin (OGSOL EG available from Osaka Gas Chemicals Co., Ltd.) having a fluorene skeleton, 30 parts by weight of an epoxy resin (EX-1040 available from Nagase ChemteX Corporation) having a fluorene skeleton, 30 parts by weight of 1,3,3-tris{4-[2-(3-oxetanyl)]butoxyphenyl}butane, and 1 part by weight of a photoacid generator (CPI-200K available from San-Apro Ltd.) in ethyl lactate.

Over-Cladding Layer Material

An over-cladding layer material was prepared by mixing 100 parts by weight of an epoxy resin (EP4080E available from Adeka Corporation) having an alicyclic skeleton and 2 parts by weight of a photoacid generator (CPI-200K available from San-Apro Ltd.).

Production of Mold for Formation of Over-Cladding Layer

A mold component identical in shape with the over cladding layer was produced, with the mold component protruding upwardly from an upper surface of the base member, by cutting an aluminum plate by means of a rotating cutting blade.

Then, the structure was placed on a bottom of a mold production container with the mold component located on an upper side and with the base member located on a lower side. It is noted that, prior to the placement of the structure, a release agent was applied onto an interior surface of the container and surfaces of the mold component and the base member.

Subsequently, a light-transmissive resin (polydimethylsiloxane SIM-260 available from Shin-Etsu Chemical Co., Ltd.) was injected into the container to a depth of 1 mm as measured from an upper surface of the mold component to a liquid surface of the light-transmissive resin. The light-transmissive resin was allowed to stand at an ordinary temperature (25° C.) for five days, and then heat-treated at 150° C. for 30 minutes. Thus, the light-transmissive resin was cured.

After the cured light-transmissive resin was taken out together with the mold component and the base member from the container, the mold component and the base member were removed from the cured light-transmissive resin, and an unnecessary portion of the cured light-transmissive resin was cut off. Thus, the mold of the light-transmissive resin for the formation of the over-cladding layer was produced. One end portion of an over-cladding layer formation cavity of the mold had a lens-curvature mold surface having a generally quarter arcuate lateral sectional shape (having a curvature radius of 1.4 mm). The mold had a thickness of 1 mm as measured from a bottom surface of the over-cladding layer formation cavity to a lower surface of the mold.

Production of Optical Waveguide

First, the under-cladding layer material was applied onto a surface of a stainless steel base (having a thickness of 50 μm) by means of an applicator. In turn, the under-cladding layer material was exposed to ultraviolet radiation emitted at 1500 mJ/cm$^2$, and then heat-treated at 80° C. for 5 minutes. Thus, an under-cladding layer having a thickness of 20 μm and a refractive index of 1.510 at a wavelength of 830 nm was formed on the base.

Subsequently, a core material was applied onto a surface of the under-cladding layer by means of an applicator, and then heat-treated at 100° C. for 5 minutes, whereby a photosensitive resin layer was formed. In turn, the photosensitive resin layer was exposed to ultraviolet radiation emitted at 2500 mJ/cm² via a photomask having an opening pattern conformal to a core pattern and placed with a gap of 100 μm, and then heat-treated at 100° C. for 10 minutes. Subsequently, the resulting photosensitive resin layer was developed with the use of γ-butyrolactone, whereby an unexposed portion of the photosensitive resin layer was dissolved away. Then, the resulting photosensitive resin layer was heat-treated at 120° C. for 5 minutes. Thus, a core was formed in the core pattern as having a rectangular cross section having a width of 20 μm and a height of 50 μm and having a refractive index of 1.592 at a wavelength of 830 nm.

Then, the mold for the formation of the over-cladding layer was placed on a stage, and the cavity of the mold was filled with the over-cladding layer material.

In turn, the core formed in the core pattern on the surface of the under-cladding layer was positioned with respect to the cavity of the mold, while being immersed in the over-cladding layer material. Then, the under-cladding layer was pressed against the mold with a press load of 196 N.

Subsequently, the over-cladding layer material was exposed to ultraviolet radiation emitted at 5000 mJ/cm² through the mold, whereby the over-cladding layer was formed as having a lens portion (having a generally quarter arcuate lateral sectional shape (having a curvature radius of 1.4 mm)) at its end, and having a thickness of 950 μm as measured from a top surface of the core and a refractive index of 1.510 at a wavelength of 830 nm.

Then, the over-cladding layer was demolded together with the stainless steel base, the under-cladding layer and the core from the mold. Thus, the optical waveguide was produced, which included the under-cladding layer, the core and the over-cladding layer formed on the surface of the stainless steel base.

COMPARATIVE EXAMPLE

An optical waveguide was produced in substantially the same manner as in the aforementioned example, except that a quartz mold was used for the formation of the over-cladding layer. More specifically, a plurality of quartz mold pieces were each prepared by cutting a quartz block material from one side to the other side, and bonded together with a bonding resin. Thus, the quartz mold was produced. The quartz mold would be cracked by application of a greater load. Therefore, the press load applied for pressing the under-cladding layer to the quartz mold was 48 N.

Measurement of Intensity of Received Light

Two optical waveguides were produced according to each of the inventive example and the comparative example. A light emitting device (VCSEL available from Optowell Co., Ltd.) was optically connected to the other end (an end not formed with the lens portion) of one of the two optical waveguides, and a light receiving device (CMOS linear sensor array available from TAOS Inc.) was optically connected to the other end of the other optical waveguide. These two optical waveguides were placed on opposite sides of a coordinate input area (having a diagonal dimension of 6.2 mm) with their lens portions opposed to each other. In this state, light was emitted at an intensity of 5.0 mW from the light emitting device, and the intensity of light received by the light receiving device was measured. As a result, the received light intensity was 0.8 mW in the case of the optical waveguides of the inventive example, and 0.2 mW in the case of the optical waveguides of the comparative example.

As apparent from the above results, the optical waveguides of the inventive example were more excellent in optical transmission characteristics than the optical waveguides of the comparative example.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

The inventive optical waveguide production method is applicable to the production of an optical waveguide which is used for optical communications, optical information processing, finger touch position detecting means (position sensor) for a touch panel, and the like.

What is claimed is:

1. An optical waveguide production method, comprising:
   forming a core in a predetermined pattern on a surface of an under-cladding layer; and
   forming an over-cladding layer to cover the core using a mold, said mold including a cavity having a mold surface conformable to a shape of the over-cladding layer;
   wherein the mold is a light-transmissive resin mold produced by placing a mold component having the same shape as the over-cladding layer in a mold production container, filling the container with a light-transmissive resin, curing the light-transmissive resin, taking out the cured resin from the container and removing the mold component from the cured resin, and the cavity for the formation of the over-cladding layer is defined by a recess formed in the mold by the removal of the mold component; and
   wherein the over-cladding layer forming step includes placing the mold with the cavity of the mold positioned upwards, filling the cavity of the mold with a photosensitive resin as an over-cladding layer material, and, after the filling, immersing the core in the photosensitive resin and exposing the photosensitive resin through the mold.

2. The optical waveguide production method as set forth in claim 1, wherein a portion of the cavity of the mold corresponding to a portion of the over-cladding layer covering a distal end of the core has a lens-curvature mold surface.

3. The optical waveguide production method as set forth in claim 1, wherein the light-transmissive resin for the mold contains a silicone resin.

4. The optical waveguide production method as set forth in claim 2, wherein the light-transmissive resin for the mold contains a silicone resin.

* * * * *